United States Patent
Spiridonov et al.

(10) Patent No.: US 9,836,440 B2
(45) Date of Patent: Dec. 5, 2017

(54) SEMANTIC STACK TRACE

(71) Applicant: Facebook, Inc., Menlo Park, CA (US)

(72) Inventors: Alexey N. Spiridonov, Mountain View, CA (US); William Jacobs, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 176 days.

(21) Appl. No.: 14/826,082

(22) Filed: Aug. 13, 2015

(65) Prior Publication Data

US 2016/0224458 A1 Aug. 4, 2016

Related U.S. Application Data

(63) Continuation of application No. 13/763,431, filed on Feb. 8, 2013, now Pat. No. 9,152,537.

(51) Int. Cl.
| | | |
|---|---|---|
| *G06F 9/44* | (2006.01) | |
| *G06F 17/22* | (2006.01) | |
| *G06F 11/34* | (2006.01) | |
| *G06F 11/36* | (2006.01) | |

(52) U.S. Cl.
CPC ............ *G06F 17/2247* (2013.01); *G06F 8/00* (2013.01); *G06F 8/313* (2013.01); *G06F 8/75* (2013.01); *G06F 11/34* (2013.01); *G06F 11/3466* (2013.01); *G06F 11/3636* (2013.01); *G06F 2201/865* (2013.01)

(58) Field of Classification Search
CPC .. G06F 11/3409; G06F 11/3636; G06F 8/443; G06F 17/2252; G06F 9/44526; G06F 9/4425; G06F 17/27; G06F 17/40; G06F 17/2247; G06T 11/206; G06Q 10/10
See application file for complete search history.

(56) References Cited

U.S. PATENT DOCUMENTS

| | | | | |
|---|---|---|---|---|
| 6,857,120 | B1* | 2/2005 | Arnold | G06F 9/4425 |
| | | | | 712/E9.082 |
| 6,971,091 | B1* | 11/2005 | Arnold | G06F 8/443 |
| | | | | 717/130 |
| 9,152,537 | B2 | 10/2015 | Spiridonov et al. | |
| 2003/0018661 | A1 | 1/2003 | Darugar | |
| 2004/0205409 | A1* | 10/2004 | Wu | G06F 8/443 |
| | | | | 714/38.13 |
| 2005/0102673 | A1 | 5/2005 | DeWitt et al. | |

(Continued)

OTHER PUBLICATIONS

U.S. Appl. No. 13/763,431 of Spiridonov, A. et al. filed Feb. 8, 2013.
(Continued)

*Primary Examiner* — Tuan Vu
(74) *Attorney, Agent, or Firm* — Perkins Coie LLP

(57) ABSTRACT

The present disclosure provides methods and systems for instrumenting a "semantic stack trace" (SST), where semantic information and dependency relationships between a plurality of code elements ("elements") are captured during runtime execution of various front-end declarative languages, and are subsequently extracted for display in a SST-enabled interactive user interface with traversing capability. Embodiments of the present invention enable a framework for traversing and debugging complex code, providing an unprecedented lens into understanding code behavior in mixed imperative and declarative construction languages.

15 Claims, 10 Drawing Sheets

(56) References Cited

U.S. PATENT DOCUMENTS

| | | | |
|---|---|---|---|
| 2005/0210454 A1* | 9/2005 | DeWitt, Jr. | G06F 11/3409 |
| | | | 717/133 |
| 2010/0058172 A1* | 3/2010 | Soldan | G06F 17/2252 |
| | | | 715/235 |
| 2010/0235815 A1* | 9/2010 | Maybee | G06F 11/3636 |
| | | | 717/125 |
| 2011/0264787 A1 | 10/2011 | Mickens et al. | |
| 2011/0283187 A1* | 11/2011 | Tibbett | G06Q 10/10 |
| | | | 715/255 |
| 2011/0289419 A1* | 11/2011 | Yu | G06F 9/44526 |
| | | | 715/738 |
| 2012/0144374 A1 | 6/2012 | Gallagher et al. | |
| 2012/0284801 A1 | 11/2012 | Goodwin et al. | |
| 2013/0249917 A1* | 9/2013 | Fanning | G06T 11/206 |
| | | | 345/440 |
| 2014/0229919 A1 | 8/2014 | Spiridonov et al. | |

OTHER PUBLICATIONS

Non-Final Office Action dated Jan. 29, 2015, for U.S. Appl. No. 13/763,431 of Spiridonov, A. et al. filed Feb. 8, 2013.

Notice of Allowance dated Jun. 11, 2015, for U.S. Appl. No. 13/763,431 of Spiridonov, A. et al. filed Feb. 8, 2013.

* cited by examiner

Node String

0 FnGetTraceAsString( )
1 E2_FnRenderB( )
2 E2_FnRenderA( )
3 [semantic caller]
4 E2FnConstruct( )
5 E1_FnRenderB( )
6 E1_FnRenderA( )
7 [semantic caller]
8 E1_FnConstruct( )
9 {main}

XHP

XHP elements corresponding to your DOM element a
↑
ui:link
↑
ui:hovercard-link
↑
ui:profile-link
↑      ↘
    x:frag
    ↑
    x:context
    ↑
    ZZTResult
    ↑       ↘
        x:migration:stringable
        ↑       ↘
            div
            ↑
            ui:stream:headline:activity
            ↑             ↘
                div
                ↑ zz:stream:home                                                       x:frag
↑                                                                      ↑
☒      zz:stream:home                 ui:stream:story
               zz:stream:home             ↑         ↘
                                                                   ul
                                    zz:stream:home       ↑
                                                                   ui:list
                                                    zz:stream:home ↑         ui:stream:sto
                                                                     ui:stream
                                                                     ↑
                                                                     zz:stream:home

SEMANTIC STACK TRACE
(bold annotations added manually for clarification)

0 /data/users/bjacobs/www/flib/mobile/ui/image/profile-picture.php(31): SemanticStackTrace::getTraceAsString()
1 /data/users/bjacobs/www/flib/mobile/ui/base/base.php(223): xhp_m__profile_picture->compose()
2 /data/users/bjacobs/www/flib/mobile/ui/image/base.php(186): xhp_m__base->renderContents()
3 /data/users/bjacobs/www/flib/mobile/ui/base/base.php(363): xhp_m__image_base->renderContents()
4 /data/users/bjacobs/www/flib/markup/xhp/core.php(252): xhp_m__base->render()
5 (): xhp_x__composable_element->__renderForSemanticStackTrace_DO_NOT_CALL()
6 /data/users/bjacobs/www/flib/core/runtime/trace/SemanticStackTrace.php(153): call_user_func_array()
7 [semantic caller]

m:profile-picture
8 /data/users/bjacobs/www/flib/mobile/story/ui/story-voice.php(50): xhp_x__composable_element->__construct()
9 /data/users/bjacobs/www/flib/mobile/ui/base/base.php(223): xhp_m__story__voice->compose()
10 /data/users/bjacobs/www/flib/mobile/ui/base/base.php(363): xhp_m__base->renderContents()
11 /data/users/bjacobs/www/flib/markup/xhp/core.php(252): xhp_m__base->render()
12 (): xhp_x__composable_element->__renderForSemanticStackTrace_DO_NOT_CALL()
13 /data/users/bjacobs/www/flib/core/runtime/trace/SemanticStackTrace.php(153): call_user_func_array()
14 [semantic caller]

m:story:voice
15 /data/users/bjacobs/www/flib/mobile/story/ui/story.php(184): xhp_x__composable_element->__construct()
16 /data/users/bjacobs/www/flib/mobile/ui/base/base.php(223): xhp_m__story->compose()
17 /data/users/bjacobs/www/flib/mobile/ui/base/base.php(363): xhp_m__base->renderContents()
18 /data/users/bjacobs/www/flib/markup/xhp/core.php(252): xhp_m__base->render()
19 (): xhp_x__composable_element->__renderForSemanticStackTrace_DO_NOT_CALL()
20 /data/users/bjacobs/www/flib/core/runtime/trace/SemanticStackTrace.php(153): call_user_func_array()
21 [semantic caller]

m:story
22 /data/users/bjacobs/www/lib/m/story/MStreamRenderers.php(218): xhp_x__composable_element->__construct()
23 /data/users/bjacobs/www/flib/mobile/ui/base/base.php(223): xhp_m__stream_stories->compose()
24 /data/users/bjacobs/www/flib/mobile/ui/base/base.php(363): xhp_m__base->renderContents()
25 /data/users/bjacobs/www/flib/markup/xhp/core.php(252): xhp_m__base->render()
26 (): xhp_x__composable_element->__renderForSemanticStackTrace_DO_NOT_CALL()
27 /data/users/bjacobs/www/flib/core/runtime/trace/SemanticStackTrace.php(153): call_user_func_array()
28 [semantic caller]

m:stream-stories
29 /data/users/bjacobs/www/lib/m/story/MStreamRenderers.php(171): xhp_x__composable_element->__construct()
30 /data/users/bjacobs/www/flib/mobile/ui/base/base.php(223): xhp_m__home__newsfeed_stream->compose()
31 /data/users/bjacobs/www/flib/mobile/ui/base/base.php(363): xhp_m__base->renderContents()
32 /data/users/bjacobs/www/flib/markup/xhp/core.php(252): xhp_m__base->render()
33 (): xhp_x__composable_element->__renderForSemanticStackTrace_DO_NOT_CALL()
34 /data/users/bjacobs/www/flib/core/runtime/trace/SemanticStackTrace.php(153): call_user_func_array()
21 [semantic caller]

SEMANTIC STACK TRACE

CLAIM OF PRIORITY

This application is a Continuation of U.S. patent application Ser. No. 13/763,431 entitled "SEMANTIC STACK TRACE," filed Feb. 8, 2013, the entire content of which is expressly incorporated herein by reference.

FIELD OF INVENTION

This invention relates generally to a stack trace, and more specifically to methods and systems for instrumenting a semantic stack trace during runtime execution of computer programs written in various front-end declarative languages.

BACKGROUND

In recent years, various server-side scripting languages have been redesigned to improve Web development. Particularly, the use of various front-end declarative languages, which involve mixed declarative and imperative constructions, has become popular due to the many advantages existing in such use over mere imperative logic. The advantages include better isolation and detection of faults (e.g. a defective component does not break an entire rendered page), capability to write shorter, cleaner, and more verifiable code, and optimization opportunities due to the ease in rearranging strongly constrained business logic. Examples of these mixed construction, front-end declarative languages include XHP/PHP, Preparables, etc. The design of these particular front-end declarative languages contains a domain specific declarative language (DSDL) embedded inside an imperative language, where the DSDL is constructed by a higher level imperative code. As in any programming language, understanding code behavior is essential in the development and production of these front-end declarative languages.

Traditionally, web developers utilize a stack trace, or backtrace, as a tool for debugging and obtaining diagnostic information about executed computer program code. However, using the traditional stack trace for understanding code written in a mixed construction language can be difficult due to the large number of choices happening during execution of imperative and declarative logic. Ordinarily, a stack trace provides a reported sequence of nested functions, represented by stack frames, called up to the current point where the stack trace is generated. In the case of an execution failure, this means only stack frames up to the point where a failure occurred are generated, but not necessarily at the point where the cause of the failure exists. Further, sibling functions of the called functions are not recorded, and so dependency relationships are not visible in a traditional stack trace. As such, a web developer is not guaranteed to see all semantic and dependency aspects of a computer program by looking at just the stack trace at the end of execution.

In the case of mixed construction languages, it is particularly difficult for the traditional stack trace to trace the sequence of executed functions through the layers of imperative and declarative constructions. For example, a stack trace for an XHP rendering loop will only present the lowest-level declarative element that failed when the code was rendered, i.e., the stack trace of the interpreter loop of the declarative language. However, the root cause of the failure is not necessarily at the interpreter loop, but often in some other component. This is particularly problematic in production where the failure is not easily reproduced and a traditional stack trace is all that is available. One solution to address limitations of the traditional stack trace has been attempted in a stopgap system in Preparables, by use of a "Preparable Stack." However, a Preparable Stack only traces the immediate dependencies of the current Preparable, leaving out crucial information about the origins of those dependencies (i.e., how the dependencies came about). It is desirable to identify dependency relationships in addition to semantic information describing how those relationships were created in order to diagnose the root cause of a failure.

Thus, it is desirable to have a framework that enables developers to investigate code failures and improve production efficiency of computer programs written in mixed declarative and imperative construction languages.

SUMMARY

The present disclosure provides methods and systems for generating a "semantic stack trace" (SST). In certain embodiments, semantic information and dependency relationships between a plurality of code elements ("elements") are captured during runtime execution of various front-end declarative languages, and are subsequently extracted for display in a SST-enabled interactive user interface with traversing capability. Embodiments of the present invention enable a framework for traversing and debugging complex code, providing an unprecedented lens into understanding code behavior in mixed imperative and declarative construction languages.

One embodiment of the present invention discloses a method for capturing a SST. The method involves storing, into a SST, stack traces containing stack frames associated with a plurality of code elements (simply, "plurality of elements"). The stack frames are representative of the function call instructions, written in front-end declarative language constructed by imperative logic, of a computer program being executed, where the function calls are responsible for creating the plurality of elements. The stack traces, containing the stack frames sequentially linked according to the dependency relationships between the plurality of elements, make up the SST. In embodiments, the method includes recording the mapping of a current stack trace into a node in response to an executed instruction for construction of an element in the program code. The method also includes incrementally updating the node with an updated mapping of the current stack trace in response to an executed subsequent instruction having the element as a parameter. The method further includes storing the node in a data structure that contains a plurality of nodes representative of the plurality of elements. Moreover, the method includes generating a node string from a plurality of nodes, wherein the generating triggers recording the mapping of the current stack trace into another node.

The method described can be iterated until construction of all elements of the plurality of elements in the program code has occurred. The plurality of nodes is stored in the data structure in memory. The plurality of nodes contains the mapping of the semantic stack trace of the program code executed, where the semantic stack trace comprises all captured stack frames sequentially linked according to their mappings in the plurality of nodes. The semantic stack trace contains semantic information and dependency relationships between the plurality of elements in the executed program code.

In at least one embodiment, a node in the plurality of nodes comprises a portion of a semantic stack trace and a pointer to the remaining stack frames of the semantic stack trace, such that the portion and the pointer make up the semantic stack trace up to that point of execution in the program code.

In at least one embodiment, recording into a node comprises identifying new stack frames generated by the executed instruction for constructing an element by searching for a matching lowest function caller frame, concatenating the new stack frames with existing stack frames, and recording the mapping of the concatenated stack trace into the node.

Embodiments of the present invention also include a method and system for generating an interactive user interface where SST mode is enabled to allow investigation of semantic information and dependency relationships between the plurality of elements generated through execution of the program code. In one embodiment, a system for the interactive user interface is provided. The system comprises a dynamic display, a dependency representation, and a stack trace display. In another embodiment, a method for generating a SST-enabled interactive user interface is provided. The method comprises receiving a hover request of a document object (DOM) element, determining a corresponding set of elements related to the DOM element, generating a dynamic displaying containing origins subset of elements, receiving a first inspection request for viewing details of the origins subset, generating a dependency graph displaying hierarchical dependencies among the corresponding set of elements, receiving a second inspection request for viewing a particular element of the corresponding set, and generating a corresponding semantic stack trace.

Embodiments of the present invention may be used in a variety of debugging mechanisms. In one embodiment, a method and system may be provided for generating an annotated error log. In another embodiment, a method and system may be provided for investigation and development of a variety of complex programming languages other than front-end declarative languages. In yet another embodiment, a method and system may be provided for debugging the cross-linking between data fetching and rendering in mixed construction languages. For example, the SST may be utilized to investigate the connections between two distinct declarative languages that are used in the code database (i.e. one for data fetching and one for rendering), in addition to the internal dependencies in each of the languages.

Various examples of the methods and systems introduced above will now be described in further detail. The following description provides specific details for a thorough understanding and enabling description of these examples. One skilled in the relevant art will understand, however, that the methods and systems discussed herein may be practiced without many of these details. Additionally, some well-known structures or functions may not be shown or described in detail below, so as to avoid unnecessarily obscuring the relevant description. As will be realized by those skilled in the art, the present invention is capable of still other modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which:

FIG. 2B is an example illustrating a node string according to an embodiment of the present invention;

FIG. 4B is an example illustrating an embodiment of a dependency graph of a SST-enabled interactive user interface;

FIG. 4C is an example illustrating an embodiment of a stack trace of a SST-enabled interactive user interface; and FIG. 5 is an example illustrating an annotated error log in which some embodiments of the present invention may be utilized.

Figure 1:
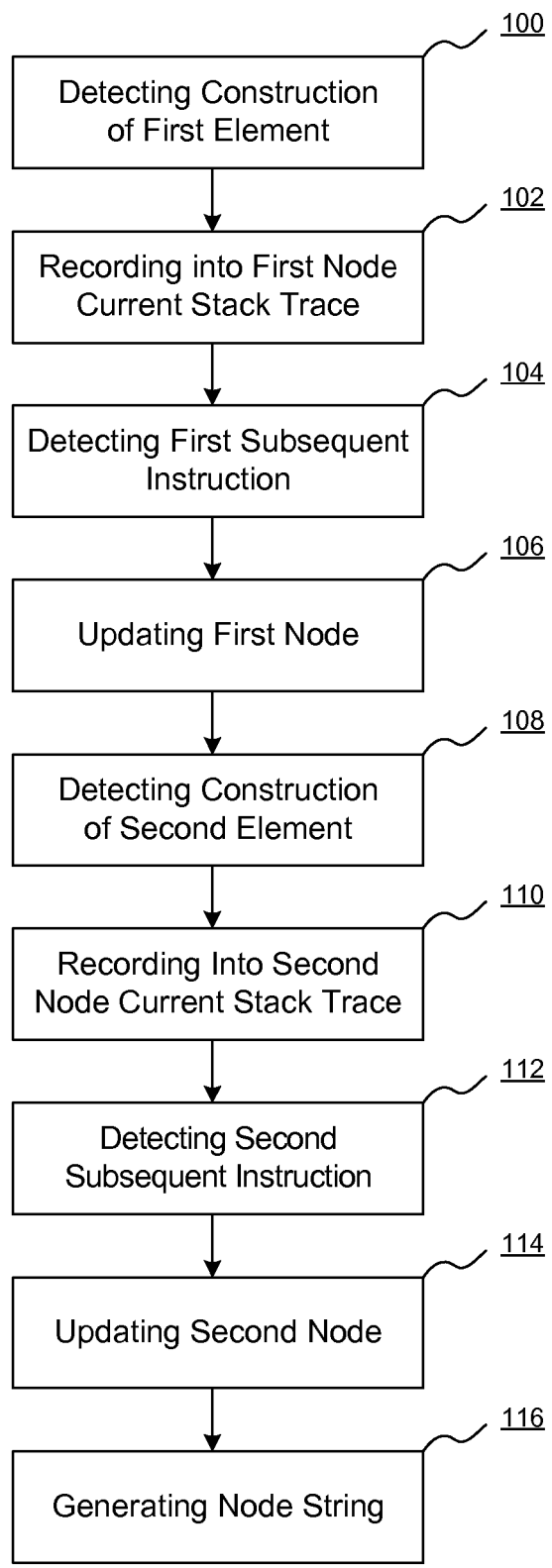
FIG. 1 is a flow diagram illustrating a method for capturing a SST according to an embodiment of the present invention.

The headings provided herein are for purposes of illustration only and do not necessarily affect the scope or meaning of the present invention.

DETAILED DESCRIPTION

References in this specification to "an embodiment," "one embodiment," or the like, mean that the particular feature, structure, or characteristic being described is included in at least one embodiment of the present invention. Occurrences of such phrases do not necessarily all refer to the same embodiment, nor are they necessarily mutually exclusive.

Various embodiments of the present invention generally relate to a stack trace. More specifically, various embodiments of the present invention relate to methods and systems for generating a "semantic stack trace" (SST) that profiles the execution of a computer program written in a mixed construction language. In one embodiment, semantic information and dependency relationships between a plurality of code elements (e.g. XHP elements, Preparables, etc.) are captured into a SST during runtime execution of the computer program. In another embodiment, the generated SST profiling the execution of computer programs is extracted for utilization in a SST-enabled interactive user interface that enables investigation of code behavior. Embodiments of the present invention enable an advantageous framework for traversing and debugging complex code, providing an unprecedented lens into understanding code behavior in mixed imperative and declarative construction languages. Additionally, the techniques for generating a SST during runtime execution provide the advantage of immediate access for investigating code behavior as code instructions are executed. For example, a web developer may utilize the SST-enabled interactive user interface, an embodiment of the present invention, to find the root cause of an XHP execution failure by tracing the stack frames in an SST generated for the code, where the SST shows dependency relationships between various XHP elements responsible for or dependent on the particular failed element.

Overview

In one embodiment, a method is provided for generating a semantic stack trace ("SST") by capturing, into the SST, stack traces containing stack frames associated with a plurality of code elements (simply, "plurality of elements"). As used herein, the term "element" denotes an instance of a class (e.g., an object instance of a class type) that is generally utilized, for example, in computer programming. The term "stack frames," as described herein, is representative of the function call instructions of a computer program being executed, where the function calls are responsible for creating the plurality of elements. The captured stack traces, which contain stack frames sequentially linked according to the dependency relationships between the plurality of elements, make up the SST for the particular computer program being profiled. For example, when execution of an XHP code creates a new XHP element, or "object," that object instance is captured in the SST (i.e., by capturing stack traces at the point of element construction and of element creation). When the code creates another new XHP element by using the previously created XHP element (e.g. previously created 'profile_maker' element causes creation of 'profile_tab' element), a dependency relationship between the two XHP elements is established, and such instance is also captured in the SST. These captured object instances allow investigation into information that is normally hidden behind the indirection involved in rendering the XHP elements in an XHP code. Particularly, the SST provides the advantage of allowing a web developer to see the sequence of function calls leading up to the creation of a particular XHP element, in addition to seeing the sequence of function calls following the creation of that element (e.g. to see child XHP elements created by that particular element).

The process for capturing stack traces, containing semantic information and dependency relationships, involve calling all associated functions related to a particular element from the constructor function of that element rather than from their immediate callers. In practice, for example, a SST gets generated by implementing certain "SST functions" to indirectly execute the associated functions from the constructor function of an element. For example, when rendering an element using an XHP code, the function "construct( )" is first executed to construct an element, a step which triggers a SST function, "getNode( )". The function getNode( ) takes a snapshot of the current stack trace (i.e., the current stack trace is immediately captured when construction of an element is detected) and records a mapping of such stack trace into a field, called a "node." The node is stored in a data structure in memory. This node gets passed to a second SST function "makeSemanticCall( )". The function makeSemanticCall utilizes the node to indirectly call the function "render( )" from the constructor function "construct( )" that is stored in the previous current stack trace captured in the node. Then, makeSemanticCall( ) takes a snapshot of the current stack trace, where the snapshot is a mapping of the current stack trace. The mapping of this new current stack trace is recorded into the node, updating the mapping of the previous current stack trace. As a result of implementing these two SST functions along with the code execution, the stack frames associated with the function render( ) are sequentially generated on top of the construct( ) frames in the current stack trace. In this way, semantic information associated with the creation origins of any element rendered and subsequent dependency information on that element are captured.

The two SST functions are repeatedly implemented throughout execution of the code. With every detection of an element being constructed, the function getNode( ) is triggered. As for every subsequent function associated with the newly constructed element, the function is called indirectly using the function makeSemanticCall, which contains the node having the element as the parameter. As a result, in addition to the semantic information (i.e. creation origins of the newly constructed element), the dependency relationships between a plurality of elements constructed are captured in the stack traces that make up the SST for the particular program code being executed.

Lastly, after no new construction of an element is detected, another SST function, "getTraceAsString ( )", is triggered, converting the plurality of nodes into a string (simply, "node string"), where the plurality of nodes is a result of the SST functions implemented to trace the executed program code. The node string contains a mapping of the SST and is stored in memory for later use (e.g. for use by a SST-enabled interactive user interface).

In embodiments, the method for capturing a SST comprises recording the mapping of a current stack trace into a node in response to an executed instruction for construction of an element, incrementally updating the node with an updated mapping of the current stack trace in response to an executed subsequent instruction having the element as a parameter, and generating a node string from a plurality of nodes, wherein the generating triggers recording the mapping of the current stack trace into another node. As used herein, the term "node" denotes a field in a data structure in memory, where the data structure is suitable for storing a plurality of nodes associated with a plurality of elements constructed as a result of the execution of a computer program. As will be discussed further in detail below, each node of the plurality of nodes stores a portion of a semantic stack trace and a pointer to a previous node (e.g., a parent node) that stores the remainder of the semantic stack trace. As a result, the portion and the pointer make up the semantic stack trace associated with the executed computer program, where the semantic stack trace contains all stack traces generated up to the point of execution at which the semantic stack trace is generated. The plurality of nodes is captured in the node string generated at the end of the method for generating a SST. The term "node string," as used herein, contains a hierarchical mapping of stack traces recorded in the plurality of nodes, where the stack traces are associated with the plurality of elements in the executed code. In one embodiment, the node string is serialized and stored in memory for later use. Such use may include generating a SST-enabled interactive user interface that enables investigation of semantic information and dependency relationships between the plurality of elements generated by the executed program code.

The method described can be iterated until construction of all elements of a plurality of elements in a program code has occurred. The resulting plurality of nodes is stored in a data structure in memory. The plurality of nodes establishes the semantic stack trace of the program code executed, where the semantic stack trace comprises all captured stack traces sequentially linked according to their mappings in the plurality of nodes, the stack traces containing the semantic information and dependency relationships between the plurality of elements in the code. For example, an XHP code containing instructions for constructing three elements will have the method described repeated for three iterations, resulting in four nodes created and stored in a data structure containing node 1, node 2, node 3, and node 4, where node 4 contains a mapping of the last current stack trace. The four nodes together produce a semantic stack trace capturing semantic information and dependency relationships between element 1, element 2, and element 3.

In at least one embodiment, recording into a node comprises identifying new stack frames generated by execution of code instruction for constructing an element. The identifying step is performed by searching the current stack trace for a lowest function caller stack frame, where that frame matches the last stack frame shared with the previous current stack trace mapped in the previous node (e.g. comparing stack frames between the current stack trace and the previous current stack trace). Once the lowest function caller stack frame (i.e. last shared stack frame) is found, the unshared stack frames in the current stack trace (i.e. identified new stack frames) are concatenated with the stack frames in the previous current stack trace and stored in memory. A mapping of the resulting concatenated trace is then recorded into the node. As such, the node comprises a portion of the mapping of the concatenated trace and a pointer to a previous node containing the remaining of the mapping of the concatenated trace, where the portion contains mapping of only the new stack frames. In other embodiments where the recording into a node step takes place on a "first node", i.e., no prior stack frames generated, there exists no previous current stack trace. As such, the pointer will contain a null value while the portion contains a mapping of the current stack trace in its entirety.

Embodiments of the present invention also include a method and system for generating a SST-enabled interactive user interface ("interactive user interface") to allow investigation of semantic information and dependency relationships between the plurality of elements generated through execution of a program code. The SST-enabled interactive user interface may be implemented for a variety of computer program codes (e.g. code for rendering a Web page). In one embodiment, a system for the interactive user interface is provided. The system comprises a dynamic display, a dependency representation, and a stack trace display.

In another embodiment, a method for generating a SST-enabled interactive user interface is provided. The method comprises receiving a hover request of a document object model (DOM) element ("DOM element") on the interactive user interface, determining a corresponding set of elements related to the DOM element, generating a dynamic display containing origins subset of elements, receiving a first inspection request for viewing details of the origins subset, generating a dependency graph displaying hierarchical dependencies among the corresponding set of elements, receiving a second inspection request for viewing a particular element of the corresponding set, and generating a corresponding semantic stack trace.

In embodiments, upon receiving a user's hover request for information of a DOM element rendered on a Web page, where the Web page is integrated with a SST-enabled interactive user interface, a corresponding set of code elements, or simply "elements", related to the requested DOM element is determined. The corresponding set of elements is extracted from the stored SST associated with the program code that caused the DOM element to be rendered on the Web page. The corresponding set of elements comprises an "origins subset" and a "dependents subset," such that the corresponding set contains elements that share at least one relationship with the DOM element (e.g. an origins element that created the DOM element, a dependent element that depends on the creation of the DOM element, etc.). The origins subset contains a set of elements sequentially linked according to their respective relationships to the DOM element, where the sequentially linked elements are responsible for the creation of the DOM element. The dependents subset contains a subset of elements that logically depend on the DOM element. Additionally, in response to the user's hover request, a dynamic display is generated on the interactive user interface. The dynamic display contains the origins subset displaying the a plurality of elements sequentially linked to represent the order of elements responsible for creation of the DOM element. The origins subset changes dynamically according to the DOM element selected by the user's hover request. In some embodiments, the dynamic display may be in the form of a tooltip, a pop-up box, or other traditional forms of information display.

Upon receiving a user's request for inspecting the origins subset ("first inspection request"), a dependency graph is generated. The dependency graph displays hierarchical dependencies among all elements in the corresponding set of elements, including both the origins subset and the dependents subset. In practice, for example, by looking at the dependency graph, a user can determine the origins subset of elements responsible for creating the XHP element "ui:hovercard-link" by seeing that "ui:hovercard-link" is a child element placed under the XHP element "ui:link," which is a child element of the XHP element "a." In the same example, a user can also determine the dependents subset of elements depending on "ui:hovercard-link" by seeing that "ui:profile:link" is a child element placed under "ui:hovercard-link." In other embodiments, the hierarchical dependencies may be truncated in display view, where a user may select on expansion arrows to see additional third party parent or child elements of a particular element.

Upon receiving a user's request for inspecting a particular element in the corresponding set of elements ("second inspection request"), a corresponding semantic stack trace is generated. The corresponding semantic stack trace is the SST that contains stack frames corresponding to the particular element selected by the user for inspection. The stack frames captured in the SST provide semantic information and dependency relationships between the particular element and associated parent, parent-child, and child elements related to the particular element. By examining the corresponding SST, a developer can investigate the sequence of stack frames of function calls that led to the creation of the particular element, in addition to investigating function calls that were triggered subsequent to the creation of that particular element.

Embodiments of the present invention may be used in a variety of debugging mechanisms. In one embodiment, a method and system may be provided for generating an annotated error log. Instead of getting an ordinary error log at the end of execution, a developer may get the SST annotated error log containing stack frames associated with the failed element. Additionally, the annotated error log may contain annotated links that generate the dependency graph related to the particular failed element.

In another embodiment, a method and system may be provided for investigation and development of a variety of complex programming languages other than front-end declarative languages. In yet another embodiment, a method and system may be provided for debugging the cross-linking between data fetching and rendering in mixed construction languages. For example, the SST may be utilized to investigate the connections between two distinct declarative languages that are used in the code database (i.e. one for data fetching and one for rendering), in addition to the internal dependencies in each of the languages.

Methods and Systems for Generating a Semantic Stack Trace

In one embodiment of the present invention, a method for capturing stack traces into a semantic stack trace is provided. The method comprises detecting a construction of an element, recording into a node a mapping of a current stack trace subsequent to detection of the construction of the element, detecting a subsequent code instruction having the element as a parameter, and incrementally updating the node with an updated mapping of the current stack trace. The method further comprises generating a node string upon detection of no new construction of an element.

In an illustrative embodiment, two iterations of the method for capturing stack traces into a semantic stack trace are discussed to illustrate the innovative aspect of the invention. In other embodiments, the method may be repeated for more than two iterations to capture semantic information and dependency relationships of a plurality of elements (e.g., ten elements). In yet other embodiments, the method may be repeated for only one iteration, where only one element is constructed in a particular computer program.

In the illustrative embodiment, construction of a first new element is first detected upon execution of a line of code instruction for constructing an element in a computer program (simply, "first instruction"). For example, a newly constructed element is detected when a "construct( )" function in an XHP code has been called. Subsequent to detection of the construction of the new element (simply, "first element"), a mapping of a current stack trace is recorded into a node. The "node" here is a "first node" for being the first node to be created in the method provided. The term "current stack trace" as described herein is a stack trace that contains stack frames generated up to the current point that the stack trace is called (i.e., at the point subsequent to the construction of the first element). In the example, the current stack trace captured right after construction of the element is a stack frame containing the construct( ) function. Accordingly, the mapping of such stack frame in the current stack trace is recorded into the first node.

Upon detection of an execution of any subsequent code instruction having the first element as a parameter (simply, "first subsequent instruction"), the first node is incrementally updated with an updated mapping of the current stack trace. The first subsequent instruction as described herein may include, for example, a variety of program instructions having the first element as a parameter. In one example, the first subsequent instruction may be a render function for rendering the first element (e.g. a function for rendering an XHP element that eventually generates a domain object model (DOM) element on a Web page). In another example, the first subsequent instruction may be a fetching function for fetching data associated with the first element (e.g. function for fetching data to populate data field of the DOM element rendered on the Web page). When execution of the first subsequent instruction is detected, a snapshot, or mapping, of the current stack trace is taken. This updated mapping is then recorded into the first node to incrementally update the node. In this step, the current stack trace contains new stack frames added on top of the existing stack frames from the previous current stack trace, where the new stack frames are generated as a result of the executed first subsequent instruction. The first node is incrementally updated by having the updated mapping of the new stack frames incrementally added to the first node.

Upon detection of another construction of an element (i.e. construction of a "second element"), a mapping of the current stack trace is captured and recorded into a new node. The second element is detected when a next line of code instruction for constructing the second element (simply, "second instruction") has been executed in the computer program. The new node is a "second node," being a second node created in the process to store stack traces associated with the second element. The second node contains the current stack trace that comprises of existing stack frames from the previous stack trace associated with the first element in addition to new stack frames generated from execution of the second instruction.

In at least one embodiment, recording into the second node comprises identifying new stack frames generated by a code instruction (e.g. the second instruction). The identifying is performed by searching the current stack trace for a lowest function caller stack frame, where that stack frame matches the last stack frame shared with the previous current stack trace mapped in the first node (e.g. comparing stack frames between the previous current stack trace and the current stack trace). Once the lowest function caller frame is found, the unshared stack frames in the current stack trace (i.e., the new stack frames identified) are concatenated with the stack frames in the previous current stack trace and stored in memory. A mapping of the resulting concatenated trace is then recorded into the second node. In embodiment, the second node comprises a portion of the mapping of the concatenated trace and a pointer to a previous node (e.g. first node) containing the remaining of the mapping of the concatenated trace, where the portion contains mapping of only the new stack frames.

The second node is incrementally updated with a snapshot, or updated mapping, of the current stack trace upon detection of execution of a subsequent code instruction having the second element as a parameter. The subsequent code instruction (simply, "second subsequent instruction"), just like the first subsequent instruction, may be, for example, a variety of functions having the second element as the parameter. In one example, the second subsequent instruction may be a render function. In another example, the second subsequent instruction may be a fetching function. As a result of the execution of the subsequent instruction, the current stack trace contains new stack frames added on top of the existing stack frames from the previous current stack trace, where the new stack frames are generated as a result of the executed second subsequent instruction. The second node is incrementally updated by having the updated mapping of the new stack frames incrementally added to the second node.

Upon detection of no new construction of any element, a final snapshot, or mapping, of the current stack trace is taken and recorded into a third node. Additionally, the plurality of nodes (e.g., the first node, the second node, and the third node) is converted into a string (simply, "node string"). The resulting node string contains a hierarchical mapping of stack traces recorded in the plurality of nodes, where the stack traces are associated with the plurality of elements in the executed code. In one embodiment, the node string is serialized and stored in memory for later use.

Certain aspects discussed above are illustrated in the flow diagram of FIG. 1. Particularly, the embodiment in FIG. 1 discloses generating a SST for two iterations in order to illustrate the innovative aspect of the invention (i.e., capturing semantic information and dependency relationships between code elements). At step 100, a construction of an element is detected. Here, a first newly constructed element is detected in the code, where a line of code instruction for constructing a first element is executed ("first instruction"). At step 102, a mapping of a current stack trace of the executed code is recorded into the first node. At step 104, execution of a subsequent code instruction having the first element as a parameter is detected ("first subsequent instruction"). In one embodiment, the first subsequent instruction can be a render function for rendering the first element (e.g. a function for rendering an XHP element that eventually generates a domain object model (DOM) element on a Web page). In another embodiment, the first subsequent instruction can be a fetching function for fetching data associated with the first element (e.g. function for fetching data to populate data field of the DOM element rendered on the Web page). At step 106, an updated mapping of the current stack trace is recorded to incrementally update the first node.

At step 108, another construction of an element is detected. In the embodiment illustrated in FIG. 2, a second newly constructed element is detected when the next line of code instruction for constructing the second element is executed. At step 110, the mapping of the current stack trace of the executed code is recorded into the second node. The mapping of the current stack trace in step 110 contains (i) existing stack frames detailing functions that have been called in previous steps 100 to 106 and (ii) new stack frames generated by execution of the code instruction for constructing the second element ("second instruction").

At step 112, execution of a subsequent code instruction having the second element as a parameter is detected ("second subsequent instruction"). For example, the second subsequent instruction can be a render function for rendering the first element (e.g. a function for rendering an XHP element that eventually generates a domain object model (DOM) element on a Web page). In another example, the second subsequent instruction can be a fetching function for fetching data associated with the first element (e.g. function for fetching data to populate data field of the DOM element rendered on the Web page). At step 114, an updated mapping of the current stack trace is recorded to incrementally update the second node.

At step 116, where no construction of an element is detected, a node string is generated. The step of generating the node string first triggers a recording of the mapping of the current stack trace into a third node, and secondly converts the plurality of nodes (i.e, the first node, the second node, and the third node) into a string ("node string") into a string. The resulting node string contains a hierarchical mapping of stack traces recorded in the plurality of nodes, where the stack traces are associated with the plurality of elements in the executed code. In one embodiment, the node string is serialized and stored in memory for later use.

Figure 2A:
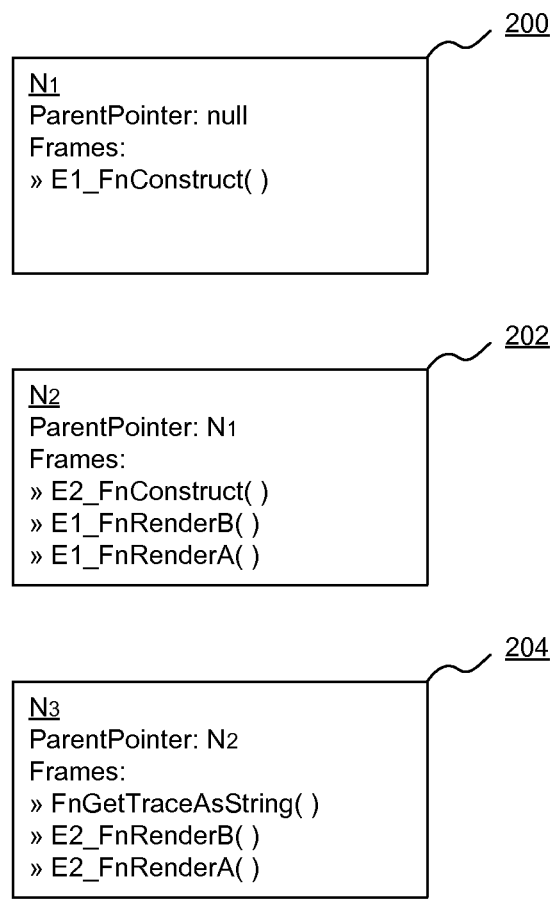
FIG. 2A is an example illustrating a SST captured in a plurality of nodes according to an embodiment of the present invention.

FIG. 2A is an example illustrating a SST mapped in a plurality of nodes according to an embodiment of the present invention. The plurality of nodes contains a mapping of various current stack traces captured throughout the execution of a computer program. FIG. 2A may be better understood with the accompaniment of FIG. 1. In FIG. 2A, Node 1 ("N1") 200 contains a recorded mapping of the current stack trace after construction of an element "E1" has been detected. N1 contains a pointer "ParentPointer" field having a "null" value, as this node is the first node generated in the process of capturing the SST. N1 also contains a plurality of stack frames, in this case, one stack frame, which is representative by the function "E1_FnConstruct( )" that has been executed by the code for creation of E1.

Node 2 ("N2") 202 contains a recorded mapping of the current stack trace after construction of an element "E2" has been detected. As the snapshot of the current stack trace is taken after detecting construction of a second element 108, as indicated in FIG. 1, the current stack trace also contains all stack traces up to that point in time. Thus, the resulting captured current stack trace includes the new stack frames generated as a result of the construction of E2, in addition to stack frames in the previous step 106, as indicated in FIG. 1. Particularly in N2, the step recording into a second node 110 identifies any new stack frames have been generated and added in the current stack frame as compared to the previous current stack trace (i.e., the stack trace recorded in N1), as indicated in FIG. 1. As such, only the portion of the mapping of the current stack trace containing the new stack frames is recorded in N2. The mapping of the remainder of the current stack trace is stored in a pointer pointing to "N1," which is the previous current stack trace. The three stack frames in 202 is representative of the identified new stack frames, which are function calls of the subsequent instructions associated with E1 (i.e., "E1_FnRenderB( )" and "E1_FnRenderA( )") and of the function call for constructing E2 (i.e., "E2_FnConstruct( )").

Node 3 ("N3") 204 contains a recorded mapping of the current stack trace after no construction of an element has been detected. When no new construction is detected, the step generating a node string 116 is triggered, as indicated in FIG. 1. As a result, the plurality of nodes generated gets converted into a string, or "node string," as illustrated in 206 of FIG. 2B. The converting into a node string is performed by the function "FnGetTraceAsString( )," which also triggers a snapshot of the current stack trace to be recorded into a node, which is represented by N3 204. The captured current stack trace contains all stack traces up to that point in time, and as such contains new stack frames representative of the function call FnGetTraceAsString( ), in addition to stack frames of the function calls of subsequent instructions associated with E2 in the previous step 114. As in N2, recording into N3 identifies new stack frames have been generated and added in the current stack frame as compared to the previous current stack trace (i.e., the stack trace recorded in N2). Only the portion of the mapping of the current stack trace containing the new stack frames is recorded in N3. The mapping of the remainder of the current stack trace is stored in a pointer pointing to "N2," which is the previous current stack trace. The three stack frames in 204 are representative of the identified new stack frames.

FIG. 2B is an example illustrating a node string according to an embodiment of the present invention. Node string 206 contains a plurality of nodes and presents a hierarchical mapping of stack traces recorded in the plurality of nodes, where the stack traces are associated with the plurality of elements (e.g. E1 and E2) in the executed code. Node string 206 contains mappings recorded in N1 200, N2 202, and N3 204. In one embodiment, the node string may be serialized and stored in memory for later use. In one embodiment, such use may include generating a SST-enabled interactive user interface that enables investigation of semantic information and dependency relationships between the plurality of elements generated by the executed program code.

Figure 2C:
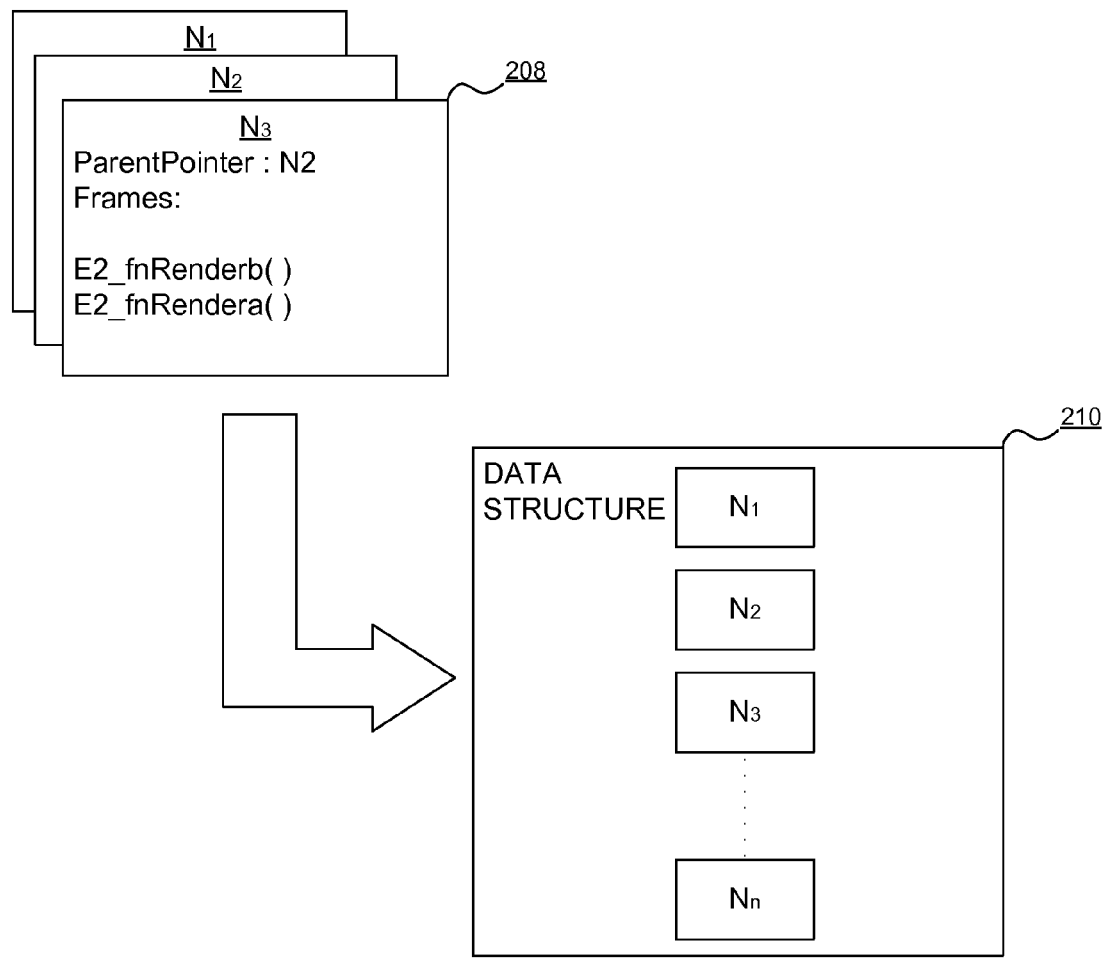
FIG. 2C is a block diagram illustrating a plurality of nodes being stored in a data structure according to an embodiment of the present invention.

FIG. 2C is a block diagram illustrating a plurality of nodes being stored in a data structure, according to an embodiment of the present invention. The plurality of nodes 208, represented by N3, N2, and N1, are stored in data structure 210 suitable for storing a plurality of nodes.

In one embodiment, a method for generating a SST-enabled interactive user interface is provided. The method comprises receiving a hover request of a document object (DOM) element, determining a corresponding set of elements related to the DOM element, generating a dynamic displaying containing origins subset of elements, receiving a first inspection request for viewing details of the origins subset, generating a dependency graph displaying hierarchical dependencies among the corresponding set of elements, receiving a second inspection request for viewing a particular element of the corresponding set, and generating a corresponding semantic stack trace.

In an illustrative embodiment, a web developer (simply, "user"), for example, utilizes the SST-enabled interactive user interface to investigate an executed computer program that has rendered DOM elements on a Web page. Upon receiving the user's hover request for information about a DOM element rendered on the Web page, a corresponding set of code elements (simply, "elements") related to the requested DOM element is determined. The content of the corresponding set of elements is extracted from the stored SST recorded during execution of the computer program. The corresponding set of elements comprises an "origins subset" and a "dependents subset." The corresponding set contains elements that share at least one relationship with the DOM element. At the same time, in response to the user's hover request, a dynamic display is generated on the interactive user interface. The dynamic display contains the origins subset displaying the a plurality of elements sequentially linked to represent the order of elements responsible for creation of the DOM element. The origins subset changes dynamically according to the DOM element selected by the user's hover request.

The user may make another request to view details about the origins subset (simply, "a first inspection request"). In response to the first inspection request, a dependency graph is generated. The dependency graph displays hierarchical dependencies among all elements in the corresponding set of elements, including both the origins subset and the dependents subset. The user may further inspect the code elements by making a request to view details about a particular element in the dependency graph (simply, a "second inspection request"). In response to the second inspection request, a corresponding semantic stack trace is generated. The corresponding semantic stack trace is the SST which contains stack frames corresponding to the particular element selected by the user for inspection. The stack frames captured in the SST provide semantic information and dependency relationships between the particular element and associated parent, parent-child, and/or child elements related to that particular element. By examining the corresponding SST, the user is able to trace the sequence of stack frames representative of function calls that led to the creation of the particular element, in addition to investigating function calls that were triggered subsequent to the creation of that particular element.

Figure 3:
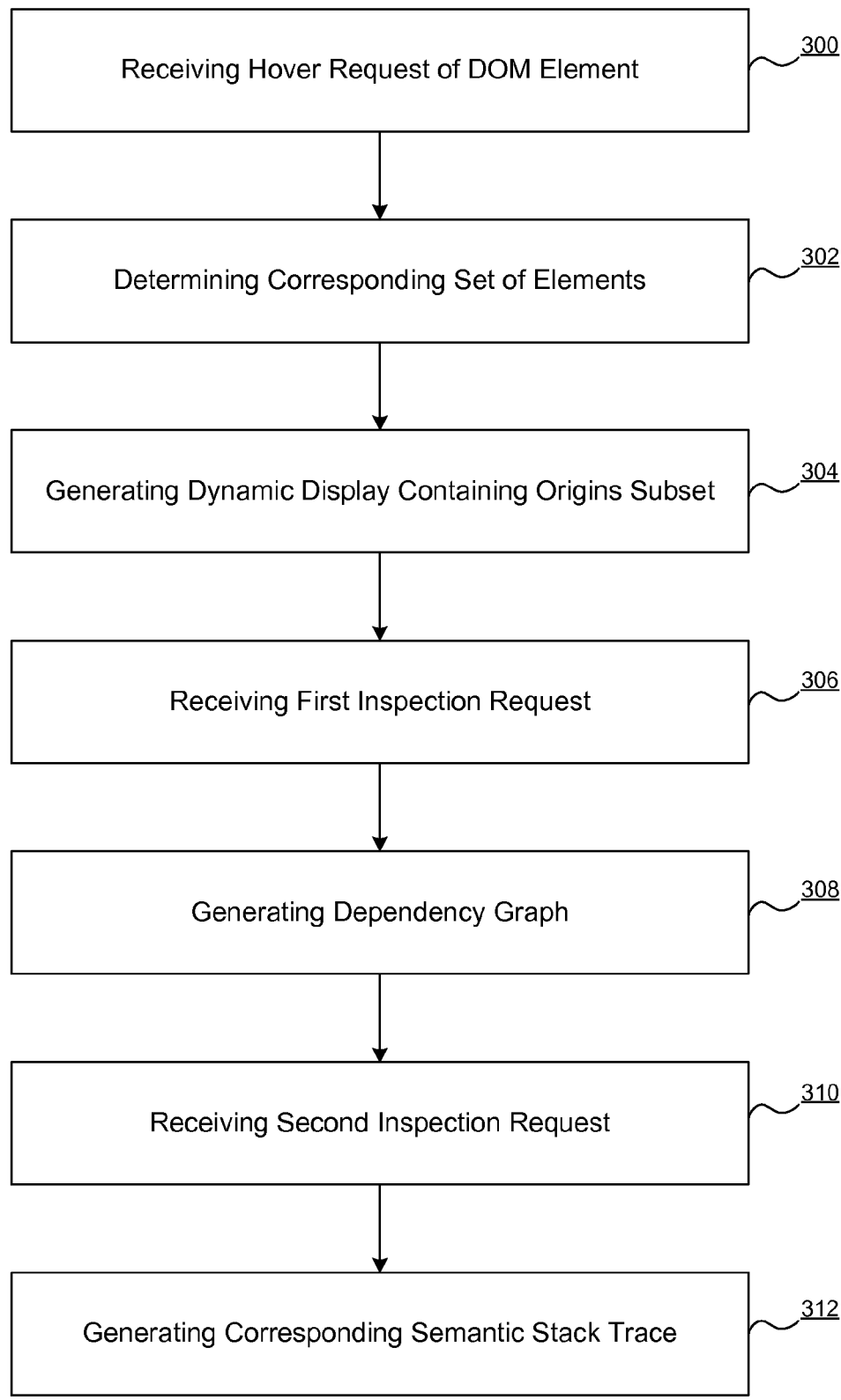
FIG. 3 is a flow diagram illustrating a method for providing a SST-enabled interactive user interface according to an embodiment of the present invention.

FIG. 3 is a flow diagram illustrating the method for providing a SST-enabled interactive user interface. At step 300, a user's hover request for information about a DOM element rendered on a Web page is received, where the Web page is integrated with a SST-enabled interactive user interface. At step 302, a corresponding set of elements associated with the requested DOM element is determined. At step 304, in response to the user's hover request, a dynamic display containing an origins subset of elements is generated on the interactive user interface. At step 306, a first inspection request is received from the user to view details about the origins subset. At step 308, a dependency graph is generated in response to the first inspection request. At step 310, a second inspection request is received to view details about a particular element in the dependency graph generated in step 308. At step 312, a corresponding semantic stack trace is generated in response to the second inspection request.

Figure 4A:
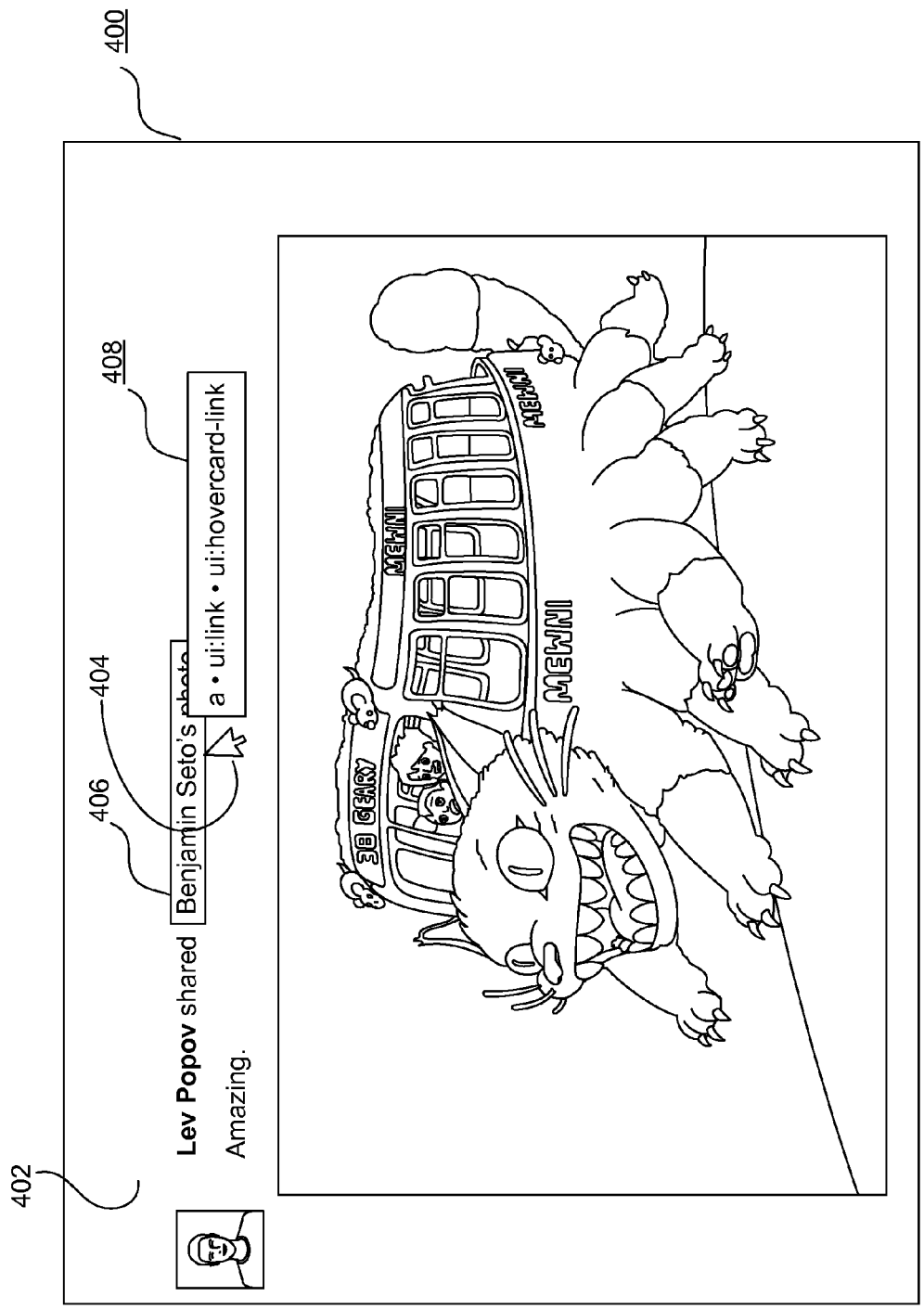
FIG. 4A is an example illustrating a dynamic display of a SST-enabled interactive user interface.

FIGS. 4A, 4B, and 4C illustrate embodiments of the interactive user interface of the present invention. FIG. 4A is an example illustrating an embodiment of a dynamic display of a SST-enabled interactive user interface. The SST-enabled interactive user interface 400 contains a rendered Web page 402 being investigated. In the interactive user interface 400, a hover request 404 to view information about a DOM element 406 (i.e., "Benjamin Seto's photo" link) on the Web page 402 is requested. A dynamic display 408 in the form of a tooltip is generated upon receiving the hover request 404. The dynamic display 408 contains an origins subset of elements (e.g., "a*ui:link*ui:hovercard-link") that is representative of the sequentially linked code elements that generated the DOM element 406 on the Web page 402. In the example in FIG. 4(a), the dynamic display 408 makes it apparent that the DOM element 406 came about as a result of the XHP element "ui:hovercard-link," which was created by the XHP element "ui:link," which was created by the XHP element "a."

FIG. 4B is an example illustrating a dependency graph of a SST-enabled interactive user interface. FIG. 4B may be better understood with the accompaniment of FIG. 3. Upon receiving the first inspection request on the interactive user interface 400 at step 306 in FIG. 4B, a dependency graph 410 is generated, as illustrated in FIG. 4B. The dependency graph displays hierarchical dependencies among all elements in the corresponding set of elements, including both the origins subset and the dependents subset. Here, by looking at the dependency graph, the user can determine the origins subset of elements responsible for creating the XHP element "ui:hovercard-link" by seeing that "ui:hovercard-link" is a child element placed under the XHP element "ui:link," which is a child element of the XHP element "a." The user can also determine the dependents subset of elements depending on "ui:hovercard-link" by seeing that "ui:profile:link" is a child element placed under "ui:hovercard-link."

FIG. 4C is an example illustrating a semantic stack trace generated on a SST-enabled interactive user interface, according to an embodiment of the present invention. FIG. 4C may be better understood with the accompaniment of FIG. 3. At step 310 in FIG. 3, upon receiving the user's second inspection request for inspecting a particular element (e.g. "m:story:voice") in the corresponding set of elements, a corresponding semantic stack trace 412 is generated, as illustrated in FIG. 4C. The semantic stack trace 412 is illustrative of stack frames corresponding to the particular element selected by the user. The stack frames captured in the SST provide semantic information and dependency relationships between the particular element (e.g. "m:story:voice") and associated parent element (e.g. "m:profile:picture"), parent-child element (e.g. "m:story"), and child element (e.g. "m:stream-stories") in hierarchical order according to dependencies toward the particular element. By examining the corresponding SST, a developer can investigate the sequence of stack frames of function calls that led to the creation of the particular element, in addition to investigating function calls that were triggered subsequent to the creation of that particular element.

Figure 5:
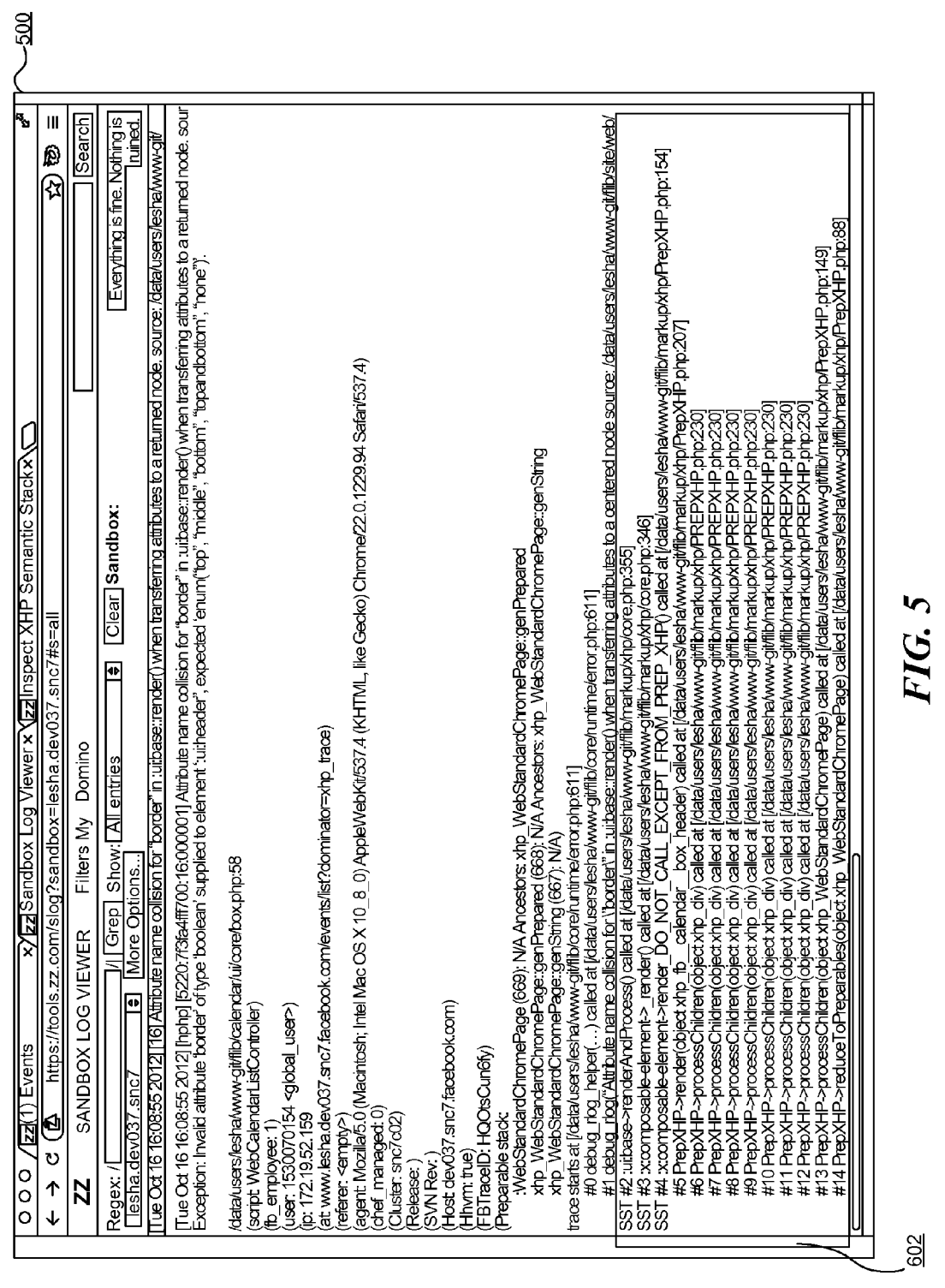

FIG. 5 is an example of an annotated error log in which some embodiments of the present invention may be utilized. When a user gets an error log after execution of a code, the error log may have SST mode implemented. Instead of the ordinary error log, the SST annotated error log contains stack frames from the SST and annotated links that generate a dependency graph related to the particular failed element.

In another embodiment of the present invention, a SST enabled system is provided. The system comprises a computer program product for profiling an executing computer program and an interactive user interface. The product comprises: (i) first instructions for performing element-construction profiling of a plurality elements in the executing program by recording into a node a current stack trace mapping comprising stack frames associated with a construction of each of the plurality of elements by the executing program; (ii) second instructions for updating the current stack trace mapping in the node by recording the current stack trace mapping comprising of stack frames associated with routines of the executing program that are executed after the construction of each of the plurality of elements, wherein the routines correspond to each element of the plurality of elements; (iii) third instructions for generating a node string upon a detection of no new construction of elements, wherein the node string captures the semantic stack trace profiling of the executing program; and (iv) fourth instructions for generating, for the plurality of elements, an interactive user interface.

The interactive user interface of the SST enabled system comprises a dynamic display, a dependency representation, and a corresponding semantic stack trace display. The dynamic display is generated upon receiving a hover request of a document object model (DOM) element on the user interface, wherein the dynamic display contains an origins subset of elements. The dependency graph is generated upon receiving a first inspection request for viewing the origins subset of elements, wherein the dependency graph contains the origins subset of elements and a dependents subset of elements. The corresponding semantic stack trace display comprises a corresponding semantic stack trace that is generated upon receiving a second inspection request for viewing a particular element in the dependency graph.

Social Networking System Architecture

Embodiments of the present invention may be utilized, for example, in building, updating, and/or maintaining a social networking system. Typically, a social networking system includes one or more Web pages rendered by the server-side scripting language (e.g., XHP) of an executed computer program. In use, the social networking system generates a variety of Web pages for users to view by rendering a plurality of document object model (DOM) elements on the Web pages. The rendered DOM elements may have display glitches that require investigation into the code of the executed computer program. In some embodiments, a web developer of the social networking system may utilize the SST framework to capture code behavior during execution of the render calls that generate the DOM elements on a particular Web page. In some embodiments, the developer may utilize the SST-enabled interactive user interface to investigate the dependency relationships between the code elements in the front-end declarative language, and further to look into the stack traces to identify function calls that were executed by the computer program in order to generate particular DOM elements on the Web page.

Figure 6:
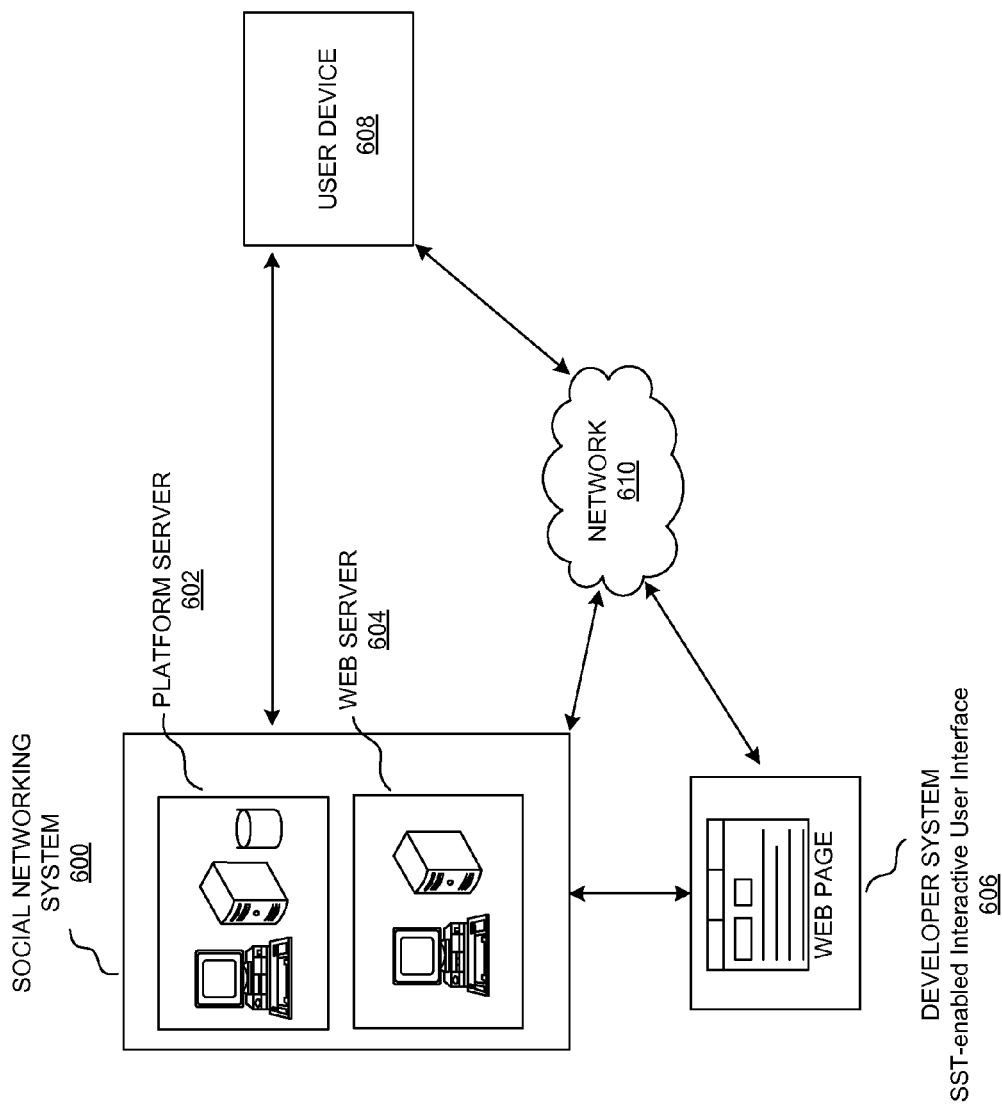
FIG. 6 is an example of a networked-based environment for a social networking system in which some embodiments of the present invention may be utilized.

FIG. 6 and the following discussion provide a brief, general description of a representative environment in which some embodiments of the present invention may be implemented. FIG. 1 is an example of a networked-based environment for a social networking system 600 in which a SST framework may be utilized by a web developer developing a Web page on the social network system 600. Social networking system 600 illustrated by FIG. 6 includes a platform server 602, a web server 604, and an SST-enabled interactive user interface 606. A user 608 connects with social networking system 600 over network 610 using an Internet connection. In production, a web developer investigating a web page rendered for use by user 608 can view the web page using embodiments of the SST framework by using SST-enabled interactive user interface 606. In other embodiments, social networking system 600 may include additional, fewer, or different modules for various applications. Conventional components such as network interfaces, security mechanisms, data storage, and the like are not shown so as to not obscure the details of the networked-based environment.

Some portions of this description may be presented in terms of algorithms and symbolic representations of operations on information. These algorithmic descriptions and representations are commonly used by those skilled in the data processing arts to convey effectively the substance of their work to others skilled in the art. These operations, while described functionally, computationally, or logically, are understood to be implemented by computer programs or equivalent electrical circuits, microcode, or the like. The described operations may be embodied in software, firmware, hardware, or any combinations thereof. For example, a software module may be implemented with a computer program product comprising a computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method executed by a processor of a computing device having a memory with executable instructions stored thereon for implementing execution of the method, comprising:
   generating an interactive user interface having a document object model (DOM) element;
   receiving a hover request of the DOM element;
   determining, from a semantic stack trace, a subset of elements related to the DOM element, wherein the subset comprises an origins subset having elements that created the DOM element and a dependents subset having elements that depend on the DOM element;
   generating, in response to the hover request and in the interactive user interface, a dynamic display containing the origins subset, wherein the elements of the origins subset are sequentially linked to the DOM element based on their respective relationship toward creation of the DOM element;
   receiving a first inspection request for viewing details of the origins subset;
   causing, in response to the first inspection request, a dependency graph to be displayed in the dynamic display, the dependency graph displaying hierarchical dependencies among the subset of elements related to the DOM element; and
   generating, in the dynamic display and in response to a second inspection request for viewing a specified element of the subset of elements, a specified semantic stack trace having stack frames corresponding to the specified element, the stack frames including a first set of stack frames associated with an execution of a first program instruction to construct the specified element and a second set of stack frames generated as a result of the execution of a first subsequent program instruction to render the specified element, wherein the first subsequent program instruction has the specified element as a parameter, wherein the specified semantic stack trace provides a framework for debugging code associated with the specified element.

2. The method of claim 1, wherein the origins subset comprises a plurality of parent elements, wherein the plurality of parent elements are sequentially linked according to respective relationship toward the creation of the DOM element.

3. The method of claim 1, wherein the dependents subset comprises a plurality of child elements, wherein creation of each of the plurality of child elements is dependent on the DOM element.

4. The method of claim 1, further comprising:
recording, into a first node, a mapping of a current stack trace comprising stack frames associated with an execution of a first creation instruction for a first element of a set of elements in a computer program;
incrementally updating the first node by recording, into the first node, a first updated mapping of the current stack trace in response to the execution of a first subsequent creation instruction that has the first element as a parameter;
recording, into a second node, the mapping of the current stack trace in response to the execution of a second creation instruction for a second element of the set of elements in the computer program;
incrementally updating the second node by recording, into the second node, a second updated mapping of the current stack trace in response to the execution of a second subsequent instruction that has the second element as the parameter; and
in response to a determination that no additional creation instruction exists in the computer program, generating the semantic stack trace from the first node and the second node.

5. The method of claim 4, wherein the current stack trace is a stack trace that includes individual stack frames generated up to a particular point in the execution of an instruction in the computer program.

6. The method of claim 4, wherein the second node comprises:
a portion of the mapping of the current stack trace, the portion of the mapping of the current stack trace including a second set of stack frames associated with the execution of the second instruction to construct the second element; and
a pointer to the first node.

7. A method executed by a processor of a computing device having a memory with executable instructions stored thereon for implementing execution of the method, comprising:
generating a semantic stack trace associated with a plurality of elements in a computer program;
in response to a hover request of a document object model (DOM) element on an interactive user interface:
determining, from the semantic stack trace associated with the plurality of elements, a subset of elements related to the DOM element, wherein the subset comprises an origins subset having elements that created the DOM element and a dependents subset having elements that depend on the DOM element; and
generating a dynamic display containing the origins subset, wherein the origins subset includes a plurality of elements sequentially linked to the DOM element based on their respective relationship toward creation of the DOM element; and
generating, in the dynamic display and in response to an inspection request for viewing a specified element of the subset of elements, a specified semantic stack trace having stack frames corresponding to the specified element, the stack frames including a first set of stack frames associated with an execution of a first program instruction to construct the specified element and a second set of stack frames generated as a result of the execution of a first subsequent program instruction to render the specified element, wherein the first subsequent program instruction has the specified element as a parameter, wherein the specified semantic stack trace provides a framework for debugging code associated with the specified element.

8. The method of claim 7, wherein generating the specified semantic stack trace includes:
receiving a first inspection request for viewing details of the origins subset; and
causing, in response to the first inspection request, a dependency graph to be displayed, the dependency graph displaying hierarchical dependencies among the subset of elements related to the DOM element.

9. The method of claim 7, wherein generating the semantic stack trace comprises:
recording, into a first node, a mapping of a current stack trace in response to an execution of a first instruction to construct a first element of a plurality of elements in a computer program, wherein the current stack trace is a stack trace that includes stack frames generated up to a particular point in the execution of code instructions in the computer program;
storing the first node in a data structure configured for storing a plurality of nodes, wherein the first node includes a first set of stack frames associated with the execution of the first instruction to construct the first element; and
incrementally updating the first node by recording, into the first node, a first updated mapping of the current stack trace in response to the execution of a first subsequent instruction that has the first element as a parameter.

10. The method of claim 9, wherein generating the semantic stack trace further comprises:
recording, into a second node, the mapping of the current stack trace in response to the execution of a second instruction to construct a second element of the plurality of elements in the computer program;
storing the second node in the data structure;
incrementally updating the second node by recording, into the second node, a second updated mapping of the current stack trace in response to the execution of a second subsequent instruction that has the second element as the parameter; and
in response to a determination that no additional instruction for constructing an element exists in the computer program, generating a node string from the plurality of nodes that includes at least the first node and the second node.

11. The method of claim 10, wherein the second node comprises:
- a portion of the mapping of the current stack trace, the portion of the mapping of the current stack trace including a second set of stack frames associated with the execution of the second instruction to construct the second element; and
- a pointer to the first node.

12. A computer program product for profiling an executing program, the product comprising a computer-readable non-transitory medium having stored thereon instructions executable by the processor, the instructions comprising:
- instructions for generating an interactive user interface having a document object model (DOM) element;
- instructions for performing element-construction profiling of a plurality of elements in the executing program by recording, into a node for at least one element of the plurality of elements, a current stack trace mapping, the node for the at least one element including a first set of stack frames associated with a construction of the at least one element;
- instructions for updating, for the at least one element, the current stack trace mapping in the node associated with the at least one element, the instructions for updating including:
  - instructions for recording a subsequent current stack trace mapping that includes a second set of stack frames associated with one or more routines of the executing program that are executed after the construction of the at least one element, wherein the one or more routines has the at least one element as a parameter; and
- instructions for generating, for the plurality of elements, a dynamic display in the interactive user interface, the dynamic display including a dependency graph, and a corresponding semantic stack trace, wherein the instructions include:
  - instructions for generating the dynamic display in response to receiving a hover request of the DOM element,
  - instructions for generating the dependency graph in response to receiving a first inspection request for viewing details of an origins subset of the DOM element, the dependency graph displaying hierarchical dependencies among elements related to the DOM element, the origins subset having those of the plurality of elements that created the DOM element, and
  - instructions for generating the corresponding semantic stack trace upon receiving a second inspection request for viewing the at least one element from the dependency graph, the corresponding semantic stack trace including the first set of stack frames and the second set of stack frames, the corresponding semantic stack trace providing a framework for debugging code associated with the at least one element.

13. The computer program product of claim 12, wherein the dynamic display contains the origins subset of the DOM element.

14. The computer program product of claim 12, wherein the origins subset includes a plurality of parent elements that are sequentially linked according to their respective relationship toward creation of the DOM element, the plurality of parent elements determined from a subset of elements associated with the DOM element.

15. The computer program product of claim 12, wherein the dependency graph contains a dependents subset, the dependents subset containing a plurality of child elements dependent on the DOM element, the plurality of child elements determined from a subset of elements associated with the DOM element.

* * * * *